United States Patent
Chen

(10) Patent No.: US 10,576,551 B1
(45) Date of Patent: Mar. 3, 2020

(54) COOLANT COLLET ASSEMBLY

(71) Applicant: SHIN-YAIN INDUSTRIAL CO., LTD., Taichung (TW)

(72) Inventor: Pen-Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/131,528

(22) Filed: Sep. 14, 2018

(51) Int. Cl.
*B23B 31/20* (2006.01)

(52) U.S. Cl.
CPC .... *B23B 31/202* (2013.01); *B23B 2231/2091* (2013.01); *B23B 2231/24* (2013.01); *Y10T 279/17111* (2015.01); *Y10T 279/17435* (2015.01)

(58) Field of Classification Search
CPC .......... B23B 31/202; B23B 2231/2091; B23B 2231/24; Y10T 279/17111; Y10T 279/17435
See application file for complete search history.

(56) References Cited

U.S. PATENT DOCUMENTS

| | | | | |
|---|---|---|---|---|
| 5,028,178 A | * | 7/1991 | Ronen | B23B 31/202 409/136 |
| 5,358,360 A | * | 10/1994 | Mai | B23Q 11/1084 279/20 |
| 5,405,155 A | * | 4/1995 | Kanaan | B23B 31/001 279/157 |
| 5,405,220 A | * | 4/1995 | Ishikawa | B23B 31/202 279/20 |
| 5,904,451 A | * | 5/1999 | Gerber | B23B 31/00 408/56 |
| 7,785,046 B2 | * | 8/2010 | Beckington | B23B 31/02 279/20 |
| 8,752,843 B2 | * | 6/2014 | Guy | B23B 31/202 279/157 |
| 9,022,393 B2 | * | 5/2015 | Guy | B23B 31/02 279/20 |
| 10,160,042 B2 | * | 12/2018 | Borapura | B23B 31/305 |
| 10,399,150 B2 | * | 9/2019 | Bookheimer | B23B 31/202 |
| 2006/0284385 A1 | * | 12/2006 | Chen | B23B 31/202 279/20 |
| 2013/0230361 A1 | * | 9/2013 | Stagge | B23B 31/005 409/234 |

FOREIGN PATENT DOCUMENTS

EP 781616 A1 * 7/1997

* cited by examiner

*Primary Examiner* — Eric A. Gates
(74) *Attorney, Agent, or Firm* — Rabin & Berdo, P.C.

(57) ABSTRACT

A coolant collet assembly has a collet body and a cutter. The collet body has an outer end, an inner end, an annular groove, multiple external slits, multiple internal slits, and multiple coolant channels. The external slits and the internal slits are in a staggered arrangement. Each coolant channel is defined longitudinally in the collet body around the cutter hole, is converged radially toward the outer end, and has an end communicating with a respective one of the internal slits and an opening formed in the outer end. The cutter is inserted in the cutter hole. The coolant may flow through the coolant channels of the collet body and is guided to the heating point of the working cutter with the converged coolant channels.

11 Claims, 9 Drawing Sheets

COOLANT COLLET ASSEMBLY

BACKGROUND OF THE INVENTION

1. Field of the Invention

The present invention relates to a cutter holder assembly for a machining tool, and more particularly to a coolant collet assembly that has coolant channels formed in the collet body to cool the cutter.

2. Description of Related Art

A collet is a component for clamping a cutter, and has multiple slits to provide flexible deformation to clamp the cutter tightly.

Conventional cutters may include two types, one with coolant holes and the other without any coolant hole. The cutter with coolant holes is used on a machining tool with a center coolant system. The coolant from the center coolant system may flow through the coolant holes of the cutter to cool the working cutter. The cutter without any coolant hole may be cooled by an extra coolant system instead of the center coolant system of the machining tool, because the coolant from the center coolant system may not flow through the cutter and may be congested on the mounting end of the cutter and the heating point of the working cutter may not be cooled efficiently.

To overcome the shortcomings, the present invention tends to provide a coolant collet assembly to mitigate or obviate the aforementioned problems.

SUMMARY OF THE INVENTION

The main objective of the invention is to provide a coolant collet assembly that has coolant channels having openings formed in an end of the collet body, and coolant from the center coolant system may flow through the coolant channels of the collet body to cool the heating point of the working cutter.

The coolant collet assembly in accordance with the present invention has a collet body and a cutter.

The collet body has an outer end, an inner end, an annular groove, a cutter hole, multiple external slits, multiple internal slits, and multiple coolant channels.

The outer end and the inner end are opposite each other. The annular groove is defined around the outer surface of the collet body and is located near the outer end. The cutter hole is defined axially in the collet body along the center axis of the collet body. The external slits are defined radially in the collet body, are arranged around the cutter hole at equiangular intervals, extend longitudinally from the outer end, and communicate with the cutter hole. Each external slit has an outer opening formed in the outer surface, an end opening formed on the outer end, an inner opening communicating with the cutter hole, an inner edge adjacent to the cutter hole and opposite the outer end of the collet body, and an outer edge on the outer surface and opposite the outer end of the collet body. An extension length of each external slit is shorter than the longitudinal length of the collet body. The internal slits are defined radially in the collet body, are arranged around the cutter hole at equiangular intervals, extend longitudinally from the inner end, communicate with the cutter hole, and are in a staggered arrangement with the external slits. Each internal slit has an outer opening formed in the outer surface, an end opening formed on the inner end, and an inner opening communicating with the cutter hole.

An extension length of each internal slit is shorter than a distance from the inner end to the annular groove. A width of each internal slit is larger than the width of each external slit. The coolant channels are defined longitudinally in the collet body around the cutter hole, converged radially toward the outer end. Each coolant channel has a hole axis, an end communicating with a respective one of the internal slits, and an opening formed in the outer end. An angle between the hole axis and the center axis is greater than 0 degree and less than or equal to 12 degrees.

The cutter has a mounting end and a cutting end, and is inserted in the cutter hole of the collet body from the mounting end and protruding from the outer end of the collet body, wherein a distance from the outer end of the collet body to the cutting end of the cutter is four times of the diameter of the cutter.

Other objects, advantages and novel features of the invention will become more apparent from the following detailed description when taken in conjunction with the accompanying drawings.

DETAILED DESCRIPTION OF PREFERRED EMBODIMENT

Figure 1:
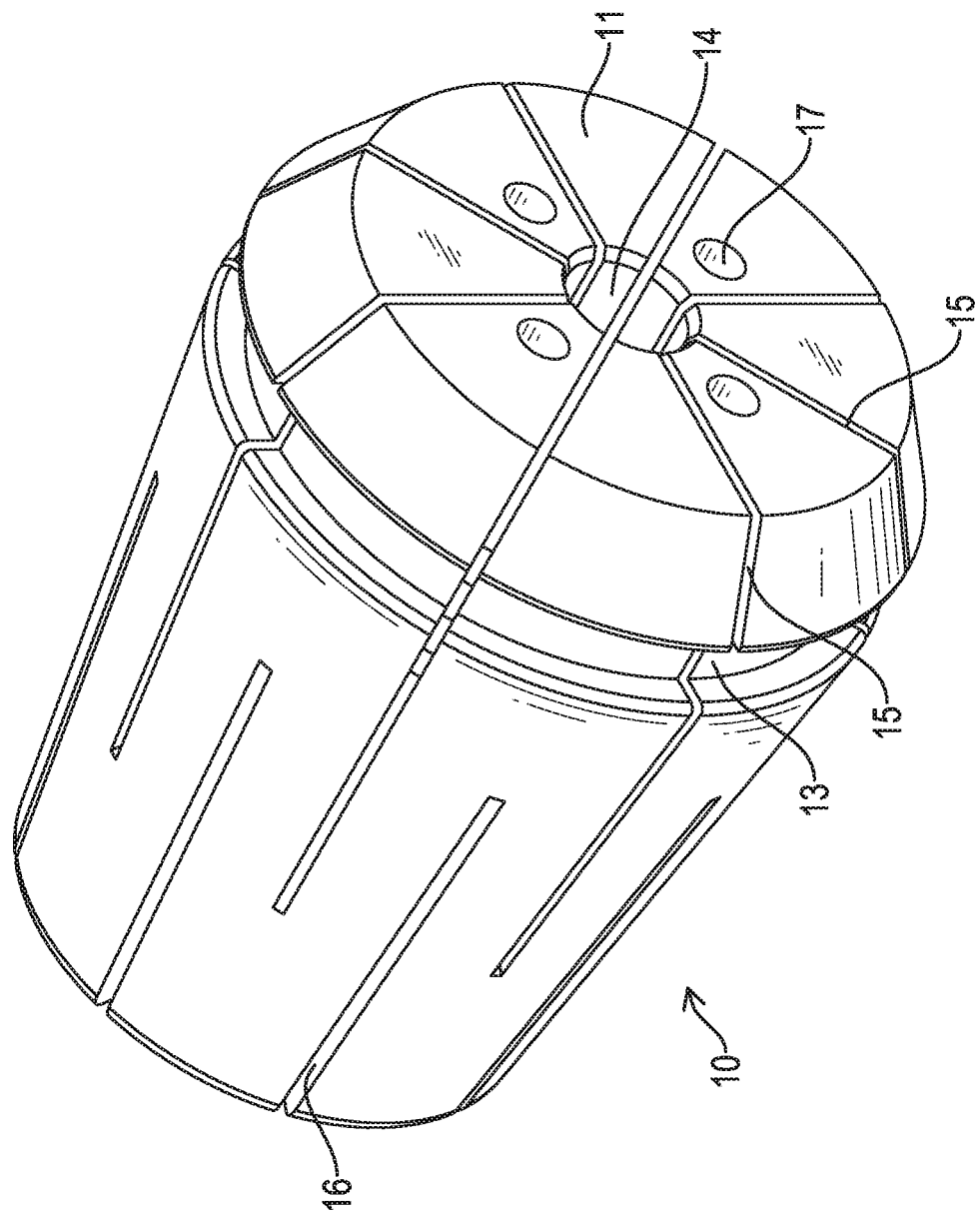
FIG. 1 is a perspective view of a first embodiment of a collet body of a collet assembly in accordance with the present invention.
Figure 2:
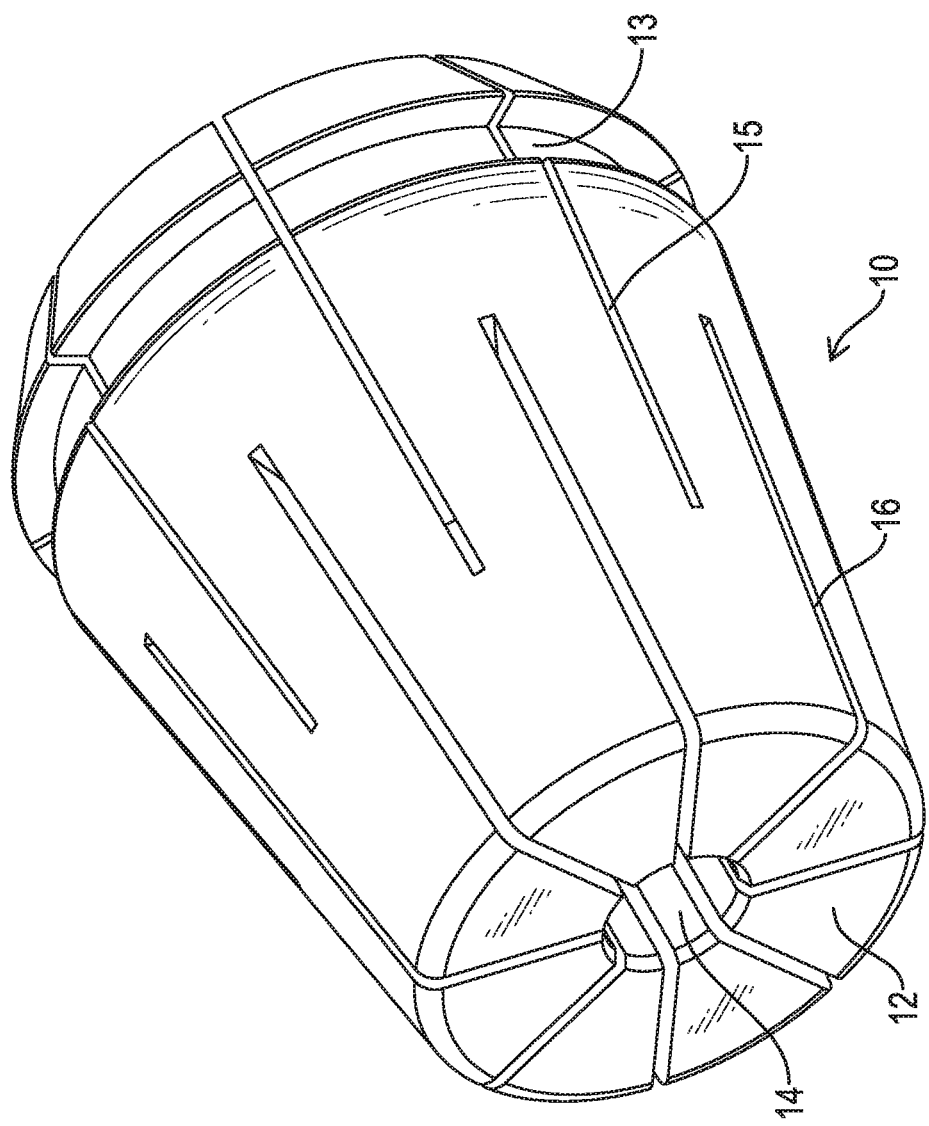
FIG. 2 is another perspective view of the collet body of the collet assembly in FIG. 1.
Figure 3:
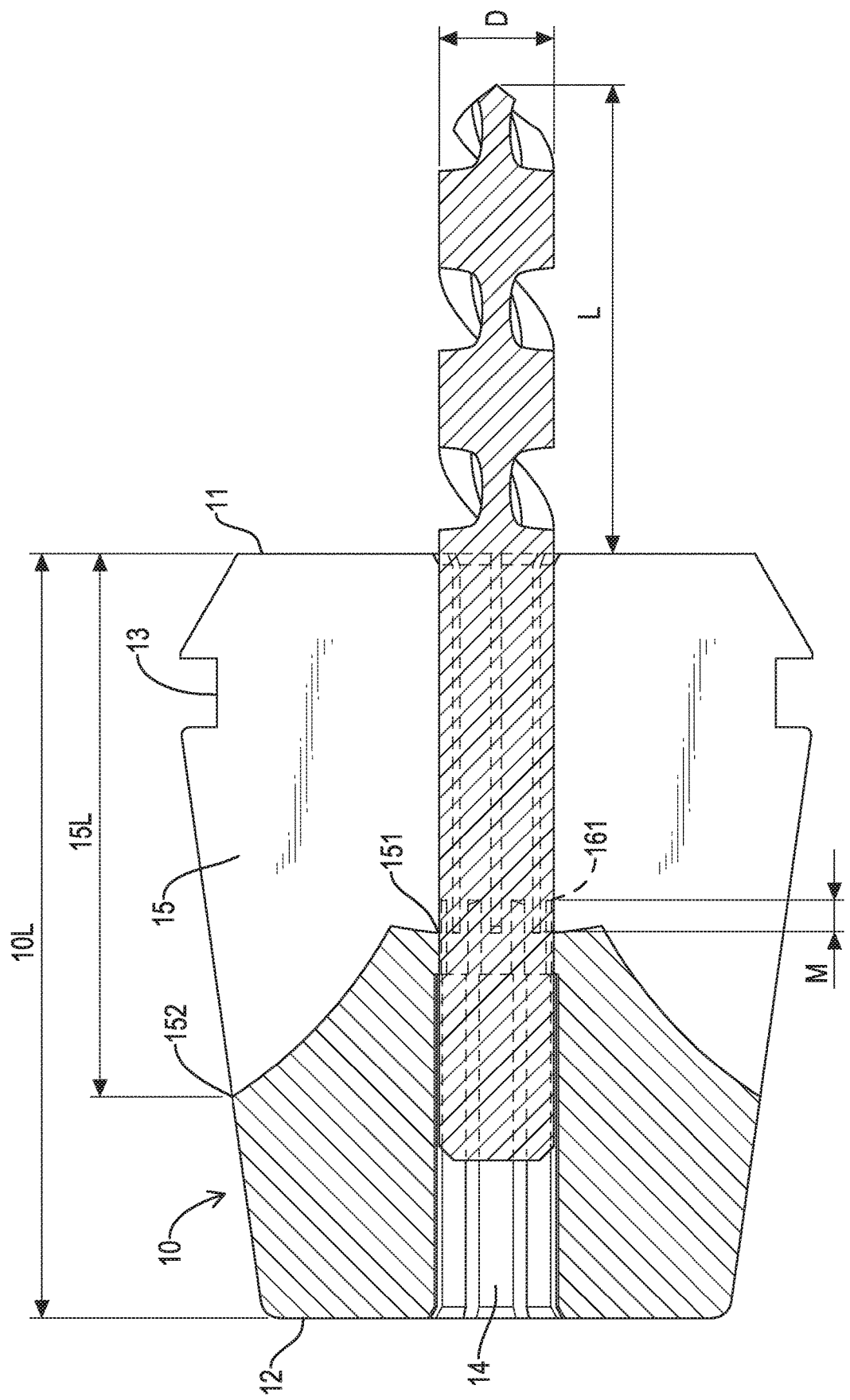
FIG. 3 is a cross sectional side view of the collet assembly in accordance with the present invention.
Figure 4:
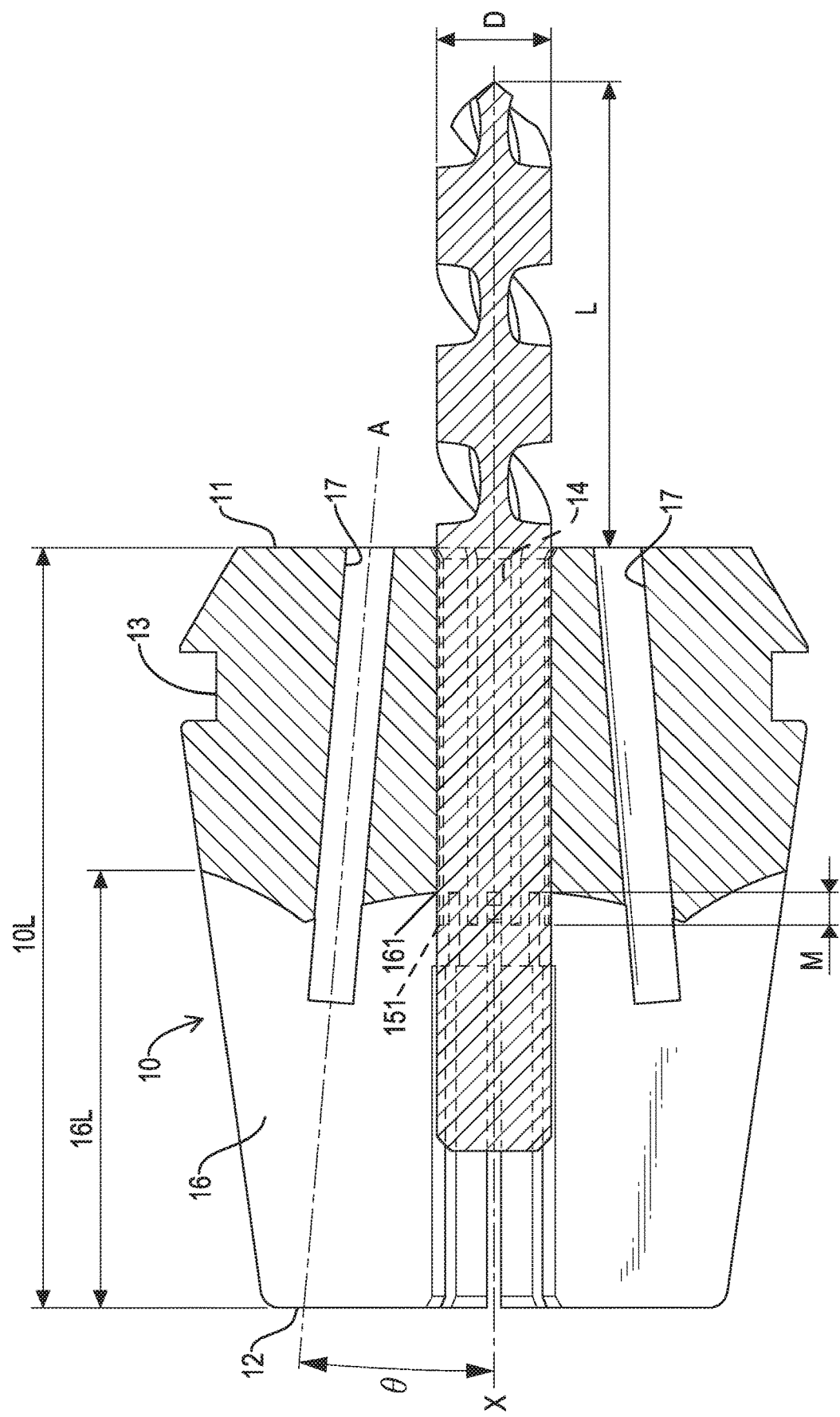
FIG. 4 is another cross sectional side view of the collet assembly in FIG. 3.
Figure 5:
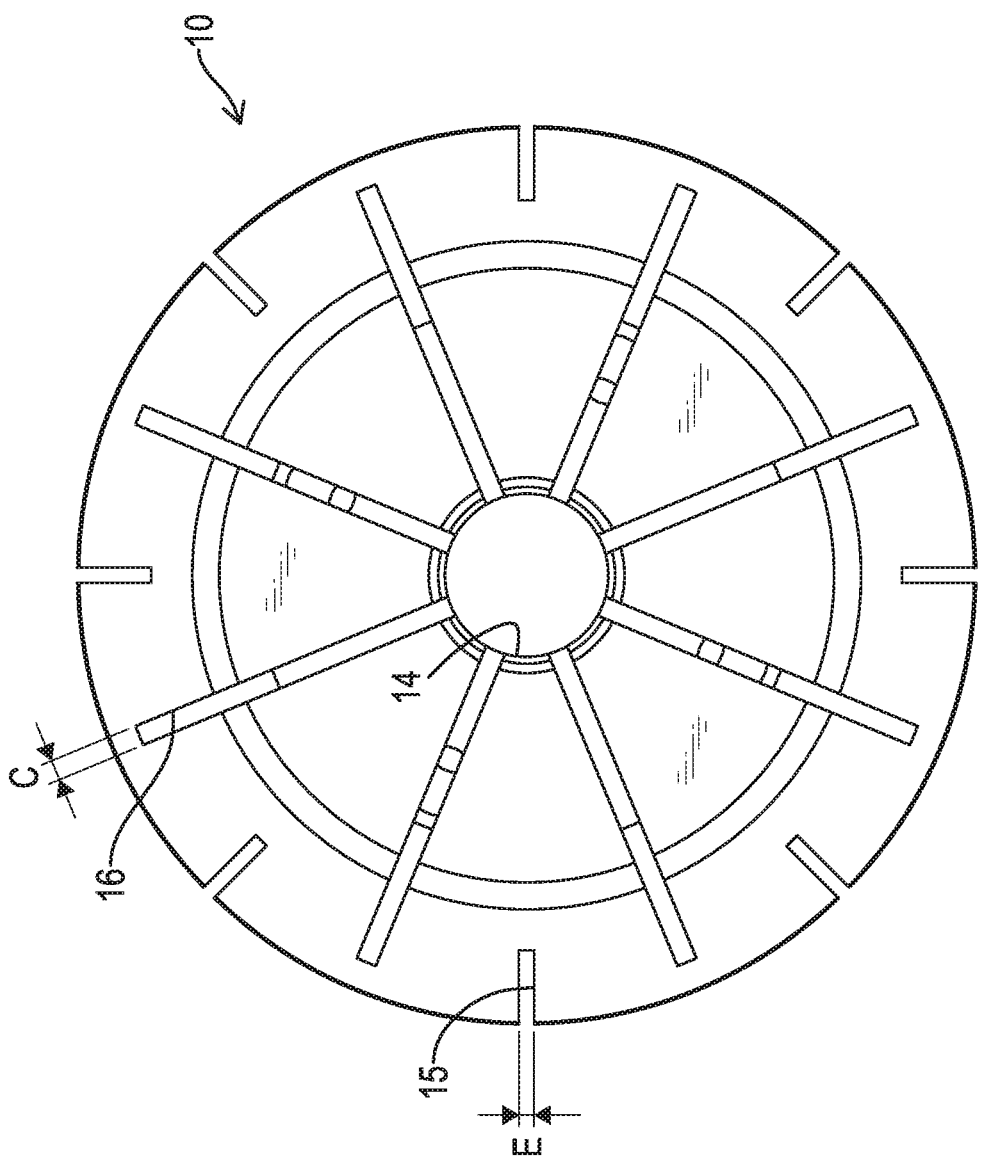
FIG. 5 is an end side view of the collet body of the collet assembly in FIG. 1.

With reference to FIGS. 1 to 5, a collet assembly in accordance with the present invention comprises a collet body 10 and a cutter 20.

The collet body 10 has a center axis X, an outer end 11, an inner end 12, an outer surface, an annular groove 13, a cutter hole 14, eight external slits 15, eight internal slits 16, and four coolant channels 17.

The outer end 11 and the inner end 12 are opposite each other. The annular groove 13 is defined around and recessed in the outer surface and is located near the outer end 11. The collet body 10 is formed as a bicone, and a diameter of the collet body 10 where the annular groove 13 is formed is larger than a diameter of the outer end 11 and a diameter of the inner end 12. The cutter hole 14 is defined axially in the collet body 10 along the center axis X.

The external slits 15 are defined radially in the collet body 10, are arranged around the cutter hole 14 at equiangular intervals, extend longitudinally from the outer end 11, and communicate with the cutter hole 14. Each external slit 15 has an outer opening formed in the outer surface of the collet body 10, an end opening formed on the outer end 11, an inner opening communicating with the cutter hole 14, an inner edge 151 adjacent to the cutter hole 14 and opposite the outer end 11, and an outer edge 152 on the outer surface of the collet body 10 and opposite the outer end 11. An extension length 15L of each external slit 15 is shorter than the longitudinal length 10L of the collet body 10, and a distance from the outer end 11 to the inner edge 151 of each external slit 15 is shorter than a distance from the outer end 11 to the outer edge 152 of each external slit 15.

The internal slits 16 are defined radially in the collet body 10, are arranged around the cutter hole 14 at equiangular intervals, are in a staggered arrangement with the external slits 15 at equiangular intervals, extend longitudinally from the inner end 12, and communicate with the cutter hole 14. Each internal slit 16 has an outer opening formed in the outer surface of the collet body 10, an end opening formed on the inner end 12, an inner opening communicating with the cutter hole 14, and an inner edge 161 adjacent to the cutter hole 14 and opposite the inner end 12. An extension length 16L of each internal slit 16 is shorter than a distance from the inner end 12 to the annular groove 13. A width C of each internal slit 16 is larger than a width E of each external slit 15. A distance from the inner end 12 to the inner edge 161 of each internal slit 16 is larger than a distance from the inner end 12 to the inner edge 151 of each external slit 15, and each external slit 15 and each internal slit 16 have an overlapping segment M defined on the surface of the cutter hole 14 from a position on the inner edge 161 of each internal slit 16 to a corresponding position on the inner edge 151 of each external slit 15.

The coolant channels 17 are defined longitudinally in the collet body 10, are arranged around the cutter hole 14, and are converged radially toward the outer end 11. Each coolant channel 17 has a hole axis A, an end communicating with a respective one of the internal slits 16, and an opening formed in the outer end 11. An angle θ between the hole axis A of each coolant channel 17 and center axis X is greater than 0 degree and less than or equal to 12 degrees, and the hole axis A of each coolant channel 17 and the center axis X intersect with each other in a position outside of the collet body 10 opposite the inner end 12 and away from the outer end 11.

The cutter 20 is a cutter without coolant channels, has a mounting end and a cutting end, is inserted in the cutter hole 14 from the mounting end, and protrudes from the outer end 11 of the collet body 10. A distance L from the cutting end of the cutter 20 to the outer end 11 of the collet body 10 is four times of the diameter D of the cutter 20.

Figure 8:
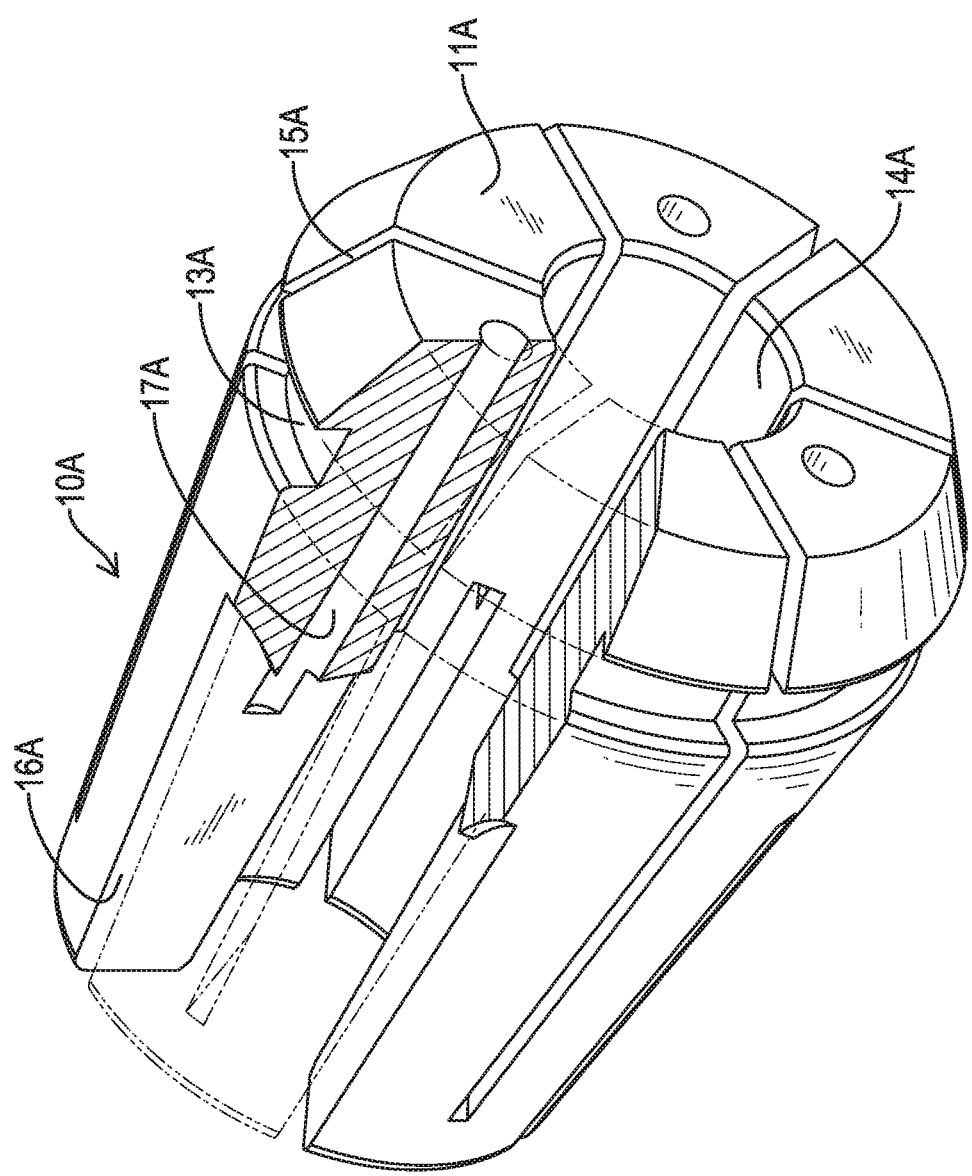
FIG. 8 is a perspective view in partial section of a second embodiment of a collet assembly in accordance with the present invention.

The amounts of the external slits 15 and the internal slits 16 may each be eight, and the amounts of the coolant channels 17 may be four as shown in FIG. 1, or the collet body 10A may have six external slits 15A, six internal slits 16A and three coolant channels 17A as shown in FIG. 8.

Figure 6:
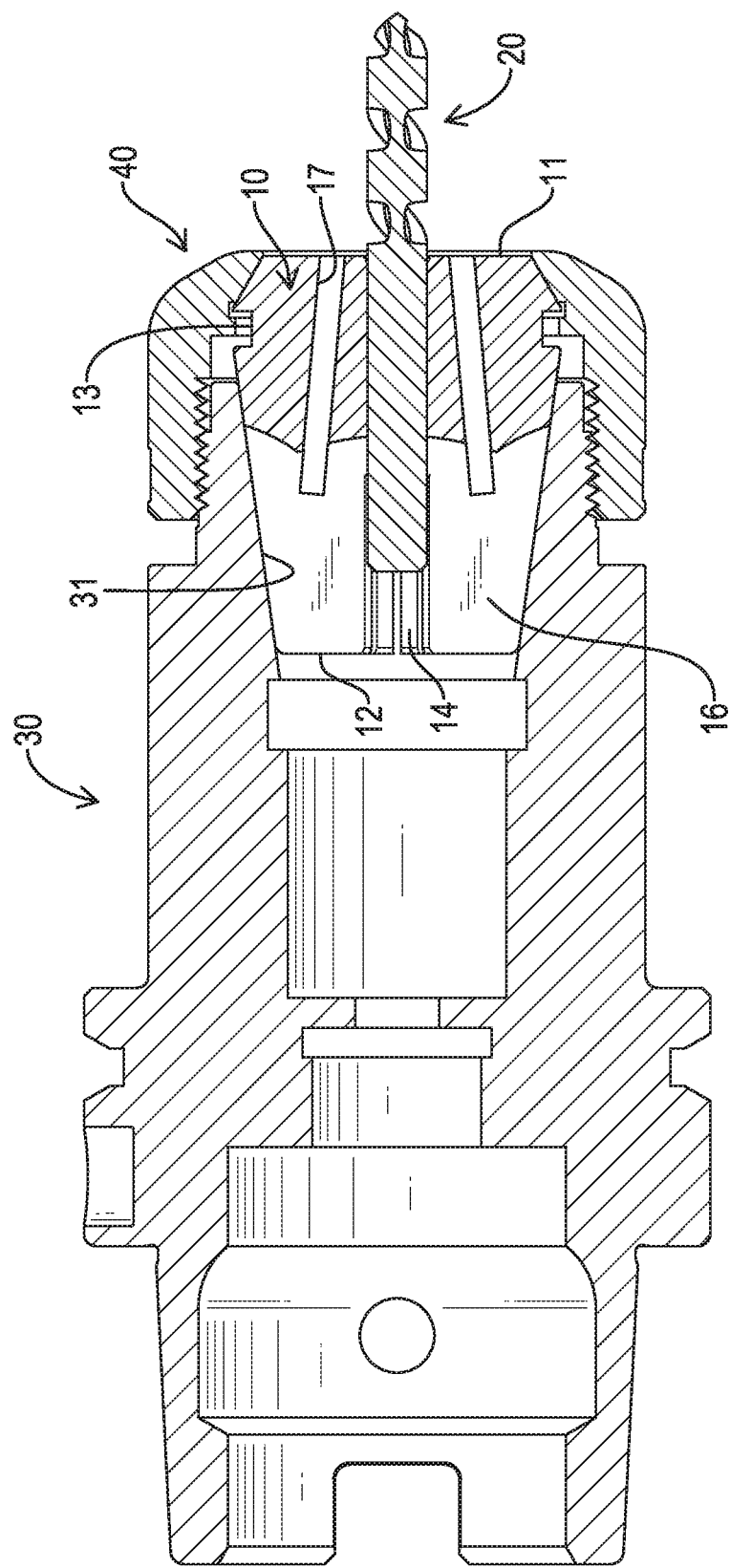
FIG. 6 is an operational cross sectional side view of the collet assembly in FIG. 3 assembled on a cutter holder.

With reference to FIG. 6, when mounting the collet assembly in accordance with the present invention into a cutter holder 30, the collet body 10 is inserted into a conical recess 31 of the cutter holder 30 from the inner end 12. A nut 40 is mounted around the collet body 10 with the engagement between an inner flange of the nut 40 and the annular groove 13 of the collet body 10. The cutter 20 is inserted in the cutter hole 14 of the collet body 10 from the mounting end. Then, the nut 40 is screwed with the cutter holder 30 to push the collet body 10 into the conical recess 31 of the cutter holder 30 to contract the external slits 15, the internal slits 16 and the cutter hole 14 of the collet body 10 to clamp the cutter 20 at a desired assembly position tightly. Because the width C of each internal slit 16 is larger than the width E of each external slit 15, the collet body 10 has a better flexible deformation on the inner portion of the collet body 10 near the inner end 12 than on the outer portion of the collet body 10 near the outer end 11. Besides, each external slit 15 and each internal slit 16 have the overlapping segment M formed in the surface of the cutter hole 14, the collet body 10 may provide a steady clamping force to clamp the cutter 20 by contractions of the external slits 15 and the internal slits 16. Because the distance L from the cutting end of the cutter 20 to the outer end 11 of the collet body 10 is equal to four times of the diameter D of the cutter 20, the clamping force and the clamping stability of the collet body 10, and the cutting efficiency and the cutting precision of the cutter 20 can be optimally balanced.

Figure 7:
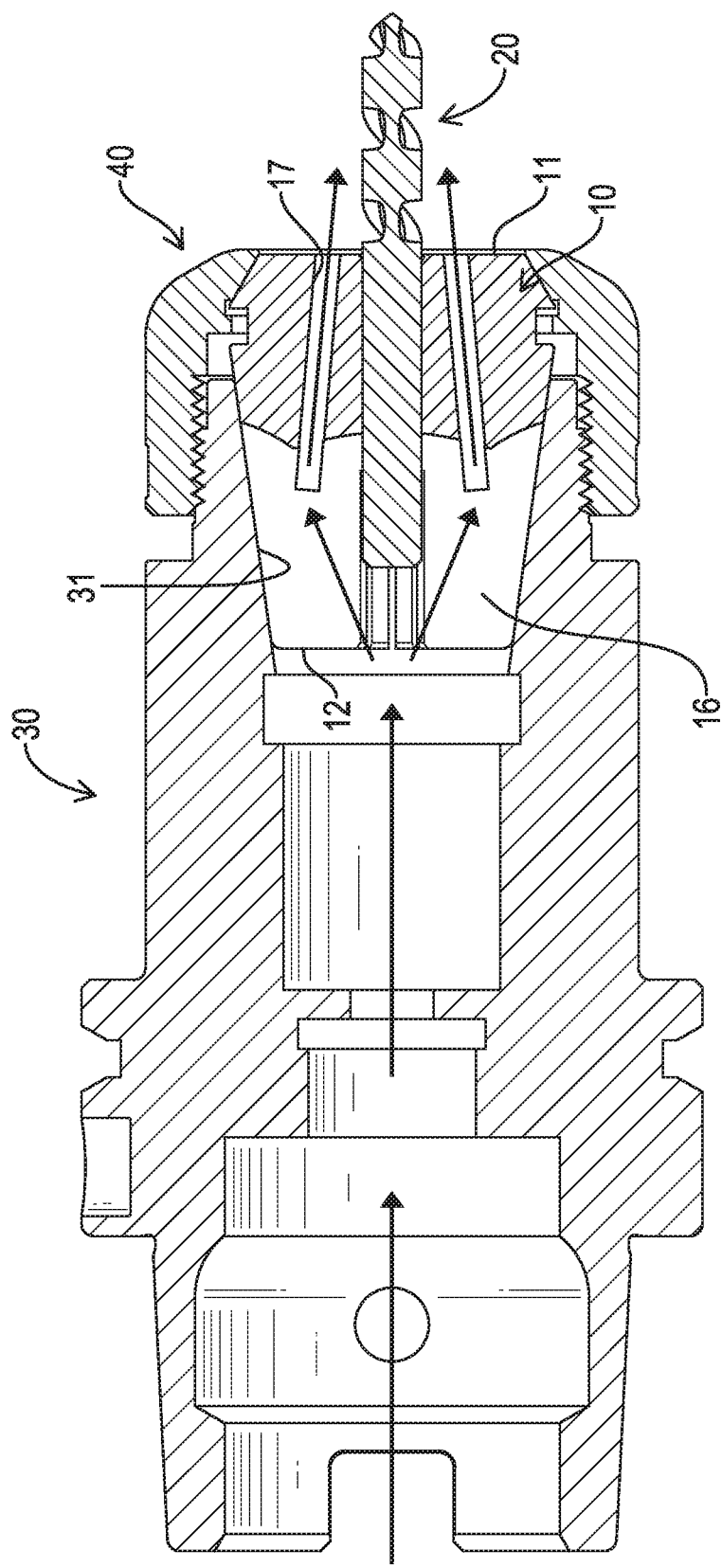
FIG. 7 is an operational cross sectional side view of the cutter holder with the collet assembly in FIG. 6.

With reference to FIG. 7, when the coolant from the center coolant system flows into the cutter holder 30, the coolant will flow in the internal slits 16 and the cutter hole 14 of the collet body 10 from the inner end 12. Because the outer openings of the internal slits 16 formed in the outer surface of the collet body 10 is closed by the conical recess 31 of the cutter holder 30 and the cutter hole 14 is blocked by the cutter 20, the coolant will flow through the coolant channels 17, and will be guided to and converged to the heating point of the working cutter 20 with the arrangement of the coolant channels 17 converged toward the outer end 11.

Because the distance L from the cutting end of the cutter 20 to the outer end 11 is four times of the diameter D of the cutter 20, the length of the distance L depends on the length of the diameter D of the cutter 20. To lead the coolant converged to and cooling the heating point of the working cutter 20, the angle θ between the center axis X and the hole axis A of each coolant channel 17 corresponds to the distance L, and when the diameter D of the cutter 20 is larger, the angle θ between the center axis X and the hole axis of each coolant channel 17 will be smaller. The preferred range of the angle θ is greater than 0 degree and less than or equal to 12 degrees, whereby a good cooling effect for cooling the cutter 20 can be provided. Moreover, the distance from the outer end 11 to the inner edge 151 of each external slit 15 is shorter than the distance from the outer end 11 to the outer edge 152 of each external slit 15, and the inner openings of the external slits 15 communicating with the cutter hole 14 may be closed by the cutter 20 inserted in the cutter hole 14. So the coolant will not be diverted to the external slits 15, and will be concentrated to the coolant channels 17 to provide an optimal cooling efficiency for cooling the cutter 20.

Figure 9:
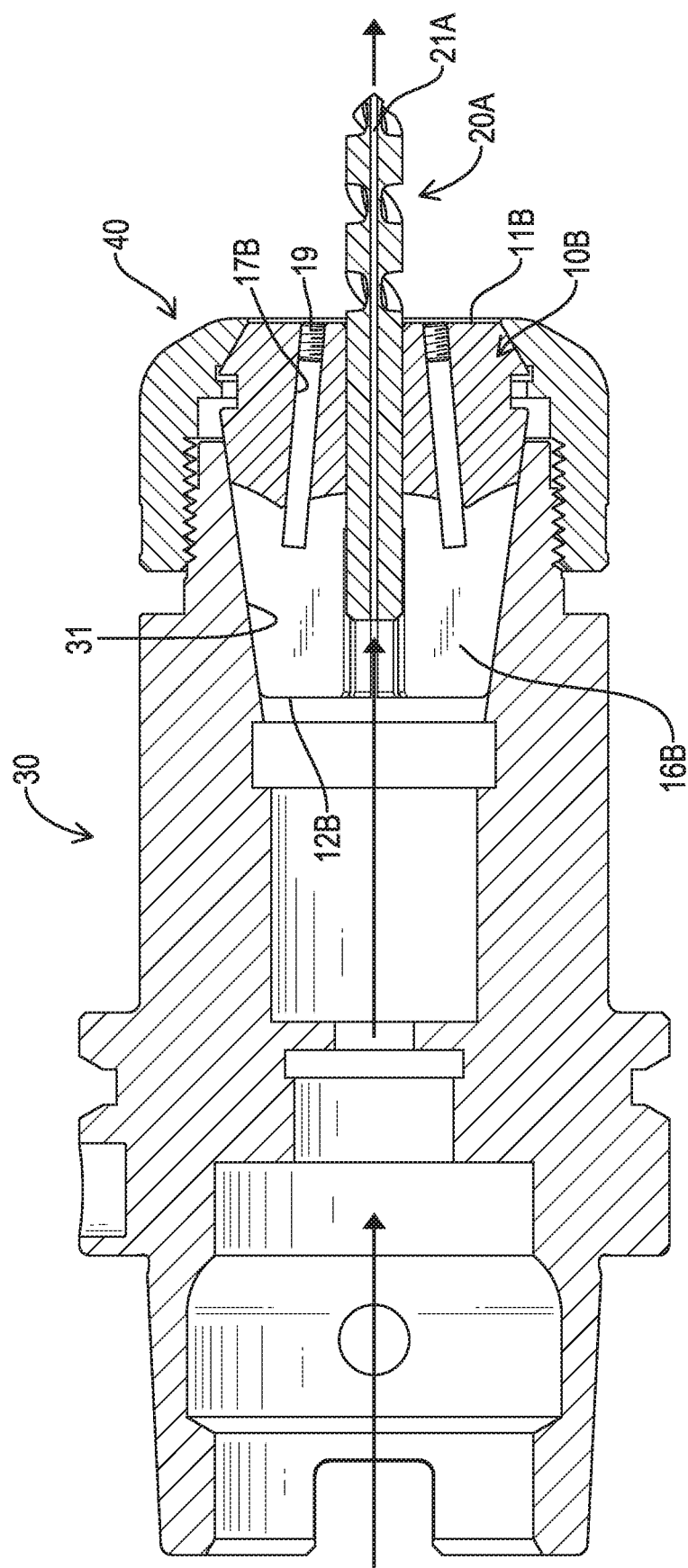
FIG. 9 is an operational cross sectional side view of a third embodiment of a collet assembly in accordance with the present invention.

With reference to FIG. 9, a third embodiment of the collet assembly in accordance with the present invention is assembled on a cutter holder 30. Multiple plugs 19 are respectively detachably mounted in the coolant channels 17B and close the openings of the coolant channels 17B on the outer end 11B of the collet body 10B. The plugs 19 may be rubber plugs, bolts, and so on. In the third embodiment, a cutter 20A having coolant holes 21A defined therethrough may be inserted in the cutter hole of the collet body 10B and a distance from the outer end 11B of the collet body 10B to the mounting end of the cutter 20A is larger than a distance from the outer end 11B of the collet body 10B to the inner edge of each external slit of the collet body 10B. Because the openings of the coolant channels 17B are closed by the plugs 19 and the inner openings of the external slits are closed by the cutter 20A, the coolant may be concentrated to the coolant holes 21 of the cutter 20A to provide an optimal cooling efficiency for cooling the cutter 20A. When a cutter 20 without coolant holes is inserted in the cutter holes of the collet body 10B, the plugs 19 may be detached from the coolant channels 17B of the collet body 10B and the coolant may flow out from the coolant channels 17B to cool the cutter 20.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A coolant collet assembly comprising:
   a collet body having
   a center axis;
   an outer end;
   an inner end opposite the outer end;
   an outer surface;
   a longitudinal length;
   an annular groove defined around the outer surface and located near the outer end;
   a cutter hole defined axially in the collet body along the center axis;
   multiple external slits defined radially in the collet body, arranged around the cutter hole at equiangular intervals, extending longitudinally from the outer end and communicating with the cutter hole, and each external slit having
   an outer opening formed in the outer surface;
   an end opening formed on the outer end;
   an inner opening communicating with the cutter hole;
   a width;
   an extension length shorter than the longitudinal length of the collet body;
   an inner edge adjacent to the cutter hole and opposite the outer end of the collet body; and
   an outer edge on the outer surface and opposite the outer end of the collet body;
   multiple internal slits defined radially in the collet body, arranged around the cutter hole at equiangular intervals, extending longitudinally from the inner end, communicating with the cutter hole, and being in a staggered arrangement with the external slits, each internal slit having
   an outer opening formed in the outer surface;
   an end opening formed on the inner end;
   an inner opening communicating with the cutter hole;
   a width larger than the width of each external slit;
   an extension length being shorter than a distance from the inner end to the annular groove;
   multiple coolant channels defined longitudinally in the collet body around the cutter hole, converged radially toward the outer end, and each coolant channel having
   a hole axis;
   an end communicating with a respective one of the internal slits;
   an opening formed in the outer end; and
   an angle between the hole axis and the center axis of the collet body, the angle being greater than 0 degree and less than or equal to 12 degrees; and
   a cutter having a diameter, a mounting end and a cutting end, and inserted in the cutter hole of the collet body from the mounting end and protruding from the outer end of the collet body, wherein a distance from the outer end of the collet body to the cutting end of the cutter is four times of the diameter of the cutter.

2. The coolant collet assembly as claimed in claim 1, wherein a distance from the outer end of the collet body to the inner edge of each external slit is shorter than a distance from the outer end of the collet body to the outer edge of each external slit.

3. The coolant collet assembly as claimed in claim 2, wherein a distance from the inner end of the collet body to the inner edge of each internal slit is larger than a distance from the inner end of the collet body to the inner edge of each external slit.

4. The coolant collet assembly as claimed in claim 3, wherein multiple plugs are detachably mounted in the coolant channels and closing the openings of the coolant channels on the outer end of the collet body.

5. The coolant collet assembly as claimed in claim 4, wherein the cutter has coolant holes defined through the cutter, and a distance from the outer end of the collet body to the mounting end of the cutter is larger than a distance from the outer end of the collet body to the inner edge of each external slit of the collet body.

6. The coolant collet assembly as claimed in claim 5, wherein the collet body has six said external slits, six said internal slits and three said coolant channels.

7. The coolant collet assembly as claimed in claim 5, wherein the collet body has eight said external slits, eight said internal slits and four said coolant channels.

8. The coolant collet assembly as claimed in claim 4, wherein the collet body has six said external slits, six said internal slits and three said coolant channels.

9. The coolant collet assembly as claimed in claim 4, wherein the collet body has eight said external slits, eight said internal slits and four said coolant channels.

10. The coolant collet assembly as claimed in claim 3, wherein the collet body has six said external slits, six said internal slits and three said coolant channels.

11. The coolant collet assembly as claimed in claim 3, wherein the collet body has eight said external slits, eight said internal slits and four said coolant channels.

* * * * *